US007089671B2

(12) United States Patent
Haneda et al.

(10) Patent No.: US 7,089,671 B2
(45) Date of Patent: Aug. 15, 2006

(54) CIRCULAR SAW WITH AN IMPROVED LOWER BLADE GUARD

(75) Inventors: Katsuji Haneda, Okazaki (JP); Shingo Tsuchiya, Okazaki (JP); Hirotaka Noguchi, Aichi-gun (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 10/133,470

(22) Filed: Apr. 25, 2002

(65) Prior Publication Data

US 2002/0157265 A1 Oct. 31, 2002

(30) Foreign Application Priority Data

Apr. 26, 2001 (JP) ............................ 2001-130107

(51) Int. Cl.
*B27G 19/04* (2006.01)
*B23D 45/16* (2006.01)
*B27B 9/00* (2006.01)

(52) U.S. Cl. ............................ 30/391; 30/374; 30/390

(58) Field of Classification Search .................. 30/391, 30/286, 373–377, 388, 390; 83/397, 478, 83/860; 144/251.1

See application file for complete search history.

(56) References Cited

U.S. PATENT DOCUMENTS

| | | | | | |
|---|---|---|---|---|---|
| 1,314,291 | A | * | 8/1919 | Wallace | 83/473 |
| 1,623,290 | A | * | 4/1927 | Wappat | 30/377 |
| 1,900,553 | A | * | 3/1933 | Hampton | 30/391 |
| 2,072,750 | A | * | 3/1937 | Hampton | 30/391 X |
| 2,171,467 | A | * | 8/1939 | Zeruneith | 192/134 |
| 2,488,947 | A | * | 11/1949 | Vavrik | 30/376 |
| 2,671,476 | A | * | 3/1954 | Richards et al. | 30/376 |
| 2,828,784 | A | * | 4/1958 | Damijonaitis | 30/391 X |
| 2,955,629 | A | * | 10/1960 | Bork | 30/376 |
| 2,993,518 | A | * | 7/1961 | Bork | 30/391 |
| 3,491,808 | A | * | 1/1970 | Grieb | 30/391 |
| 3,701,369 | A | * | 10/1972 | Gronke et al. | 30/371 |
| 3,730,239 | A | * | 5/1973 | Karman et al. | 30/391 |
| 3,787,973 | A | * | 1/1974 | Beisch et al. | 30/391 |
| 3,922,785 | A | * | 12/1975 | Fushiya | 30/391 |
| 4,693,008 | A | * | 9/1987 | Velie | 30/390 |
| 4,856,394 | A | * | 8/1989 | Clowers | 30/391 X |
| 5,361,501 | A | * | 11/1994 | Fajnsztajn | 30/391 |
| 5,396,706 | A | * | 3/1995 | Fajnsztajn | 30/391 |
| 5,537,748 | A | * | 7/1996 | Takahashi et al. | 30/124 |
| 5,701,676 | A | | 12/1997 | Itoh | 30/388 |
| 5,873,169 | A | * | 2/1999 | James et al. | 30/391 |

* cited by examiner

*Primary Examiner*—Clark F. Dexter
(74) *Attorney, Agent, or Firm*—Lahive & Cockfield, LLP; Anthony A. Laurentano, Esq.

(57) ABSTRACT

A circular saw (1) includes a base plate (2) and a saw blade assembly (3) including a lower blade guard (9) for covering a saw blade (6). The blade guard includes a sleeve portion (10) rotatably fitted on a bearing box (8) coupled to the saw blade assembly and a sectoral portion (11) extending radially from the sleeve portion in the rear of the blade. A connecting bar (13) projects radially rearward from the sectoral portion. A spring (14) is stretched between the top of the connecting bar (13) and a lower rear portion of an upper blade guard (4) close to the base plate. When not in use, torque, generated as the product of the spring's tensile force and the perpendicular distance (S) from the line of action or the force to the axis of rotation (O), rotates the blade guard to a closed position.

12 Claims, 6 Drawing Sheets

CIRCULAR SAW WITH AN IMPROVED LOWER BLADE GUARD

This application claims priority on Japanese Patent Application No. 2001-130107 filed on Apr. 26, 2001, the contents of which are incorporated herein by reference.

BACKGROUND OF THE INVENTION

1. Field of the Invention

The present invention generally relates to electric power tools. More particularly, the present invention relates to circular saws including a base plate, a saw blade assembly mounted on the base plate, and a lower blade guard for covering the lower portion of the saw blade.

2. Description of the Related Art

A typical circular saw includes a generally rectangular base plate and a saw blade assembly mounted on the base plate. The assembly in turn includes a motor-driven circular saw blade protruding below the base plate with the lower portion or teeth of the blade covered by a rotatable lower blade guard. Additionally, an extension spring is stretched between a portion of the blade guard decentered or displaced from the axis of its rotation and the saw blade assembly at a suitable location. Under normal conditions (or when the saw is not used), the lower blade guard is rotated to its closed position by the biasing or tensile force exerted by the extension spring, thus covering the teeth of the saw blade. Conversely, to cut a workpiece, the front end of the lower blade guard is first brought into abutment with a workpiece and the tool is moved in the direction in which the cutting is to progress. The guard is then manually retracted against the biasing force of the extension spring so as to expose the teeth of the saw blade.

While this blade guard mechanism achieves its intended objective, it suffers from certain deficiencies that reduce its utility. For example, as large circular saws require an accordingly large and heavy lower blade guard, the weight of the guard may cause spontaneous rotation of the blade from the closed position, depending on the angle of the saw relative to the horizontal. If an extension spring with large tensile force is used in order to prevent such inadvertent rotation, stronger resistance to rotation will be felt when the operator abuts the blade guard against the workpiece for retraction, resulting in poorer handling comfort of the tool.

SUMMARY OF THE INVENTION

In view of the above-identified problems, -an important object of the present invention is to provide a circular saw that can effectively prevent inadvertent rotation of the lower blade guard due to its weight without compromising the handling comfort of the saw.

The aforementioned object and other related objects are realized by the invention, which provides a circular saw comprising: a base plate having a plane extending therethrough; a saw blade assembly which is mounted on the base plate and includes a rotatably driven saw blade; a lower blade guard capable of rotation about an axis for generally covering the saw blade protruding below the base plate; and an extension spring which has a longitudinal axis and is stretched between a first portion of the saw blade assembly and a second portion of the lower blade guard decentered from the axis of rotation of the blade guard, with the extension spring being adapted to rotatably bias the lower blade guard to a closed position in which the blade guard covers the saw blade. Furthermore, the second, decentered portion, at which the extension spring is connected to the lower blade guard, is selected such that the angle between the line from the decentered portion to the axis of rotation of the lower blade guard and the line of action of the tensile force of the spring gradually decreases as the lower blade guard is rotated from the closed position to expose the saw blade. In the foregoing circular saw, the torque acting on the lower blade guard is maximized when the guard is not used (rotated), whereas the torque is decreased once the retraction of the lower guard has passed an intermediate position. Therefore, if an extension spring with the same tensile force is used, the blade guard can be biased to the closed position with greater torque in this circular saw than in conventional saws. This effectively prevents inadvertent rotation of the lower blade guard due to its weight, without compromising the handling comfort of the saw, as the resistance to the rotation felt by the operator decreases as the guard is further rotated from the intermediate position.

According to one aspect of the present invention, the perpendicular dropped from the longitudinal axis of the extension spring to the axis of rotation of the guard is adapted to be substantially at its longests when the lower blade guard is in the closed position, such that the torque to rotate the lower blade guard is maximized in the closed position.

According to another aspect of the present invention, the angle formed between the plane of the base plate and the line passing through the decentered portion and the axis of rotation is selected to be approximately 40 degrees when the lower blade guard is in the closed position.

According to still another aspect of the present invention, the lower blade guard includes an annular sleeve portion disposed about the axis of rotation and a sectoral portion which extends radially from the sleeve portion behind the saw blade In addition, the lower blade guard is rotatable between the closed position and a fully open position through an intermediate position in which the extension spring comes into contact with the sleeve portion, such that the spring starts to bend around the sleeve portion with further rotation of the lower blade guard.

According to yet another aspect of the present invention, the lower blade guard further includes a connecting bar having a top end and projecting radially from an upper rear edge of the sectoral portion along a line passing through the axis of rotation, with the decentered portion located at the top end of the connecting bar.

According to one feature of the present invention, the saw blade assembly further includes an upper blade guard for generally covering an upper portion of the saw blade, and the first portion of the saw blade assembly constitutes part of the upper blade guard and is located in a lower rear portion of the upper blade guard adjacent to the base plate.

According to another feature of the present invention, the circular saw further comprises a stopper mounted on the saw blade assembly behind the saw blade in such a manner that the sectoral portion of the lower blade guard abuts the stopper when the lower guard is in the closed position while exposing a forwardmost portion of the saw blade.

The invention further provides a circular saw comprising: a base plate having a plane extending therethrough; a saw blade assembly which is mounted on the base plate and includes a rotatably driven saw blade; a lower blade guard capable of rotation about an axis for generally covering the saw blade protruding below the base plate; and an extension spring having a forward end and a rear end and a longitudinal axis therethrough. The extension spring is stretched between the rear end fastened to the saw blade assembly and the forward end connected to a portion of the lower blade guard decentered from the axis of rotation and is adapted to rotatably bias the lower blade guard to a closed position in which the blade guard covers the saw blade. In this circular saw, the forward end of the extension spring is slidable from the decentered portion toward the axis of rotation of the lower blade guard as the guard is rotated from the closed position to expose the saw blade. According to this tool, the resistance to the rotation of the lower blade guard is decreased by the reduction in torque due to the shortening of the distance between the spring's forward end and the axis of rotation of the guard, as well as the reduction in torque due to the decrease in the angle formed between the line connecting the forward end of the spring to the rotational axis and the line of action of the spring's tensile force with the rotation of the guard.

According to still another feature of the present invention, the lower blade guard further includes a bolt which in turn includes top and bottom ends, a rod extending between the two ends and having a longitudinal axis therethrough, and a head at the top end. This bolt radially projects from the portion of the blade guard closest to the axis of rotation. The aforementioned decentered portion of the guard being is located at the top end of the rod, whereas the forward end of the spring is connected to the bolt in such a manner as to be slidable on the rod between the head and the bottom end as the guard is rotated from the closed position.

According to one practice of the present invention, the extension spring further includes at the forward end a ring slipped on the rod for slidably linking the spring to the bolt.

According to yet another feature of the present invention, the lower blade guard further includes an annular sleeve portion disposed about the axis of rotation, with the bolt projecting from the sleeve portion.

According to another practice of the present invention, when the lower blade guard is in the closed position, the perpendicular dropped from the longitudinal axis of the extension spring to the axis of rotation of the lower guard is adapted to be substantially at its longest, such that the torque to rotate the lower blade guard is maximized in the closed position.

According to still another practice of the present invention, the angle formed between the plane of the base plate and the line passing through the decentered portion and the axis of rotation is selected to be approximately 40 degrees when the lower blade guard is in the closed position.

According to yet another practice of the present invention, the lower blade guard is retractable or rotatable from the closed position to a fully open position through an intermediate position in which the longitudinal axis of the bolt rod forms a 90-degree angle with the longitudinal axis of the extension spring, beyond which point the tensile force of the spring starts to cause downward slide of the ring along the rod from the top end to the bottom end thereof.

Other general and more specific objects of the invention will in part be obvious and will in part be evident from the drawings and descriptions which follow.

BRIEF DESCRIPTION OF THE ATTACHED DRAWINGS

For a fuller understanding of the nature and objects of the present invention, reference should be made to the following detailed description and the accompanying drawings, in which.

Figure 4:
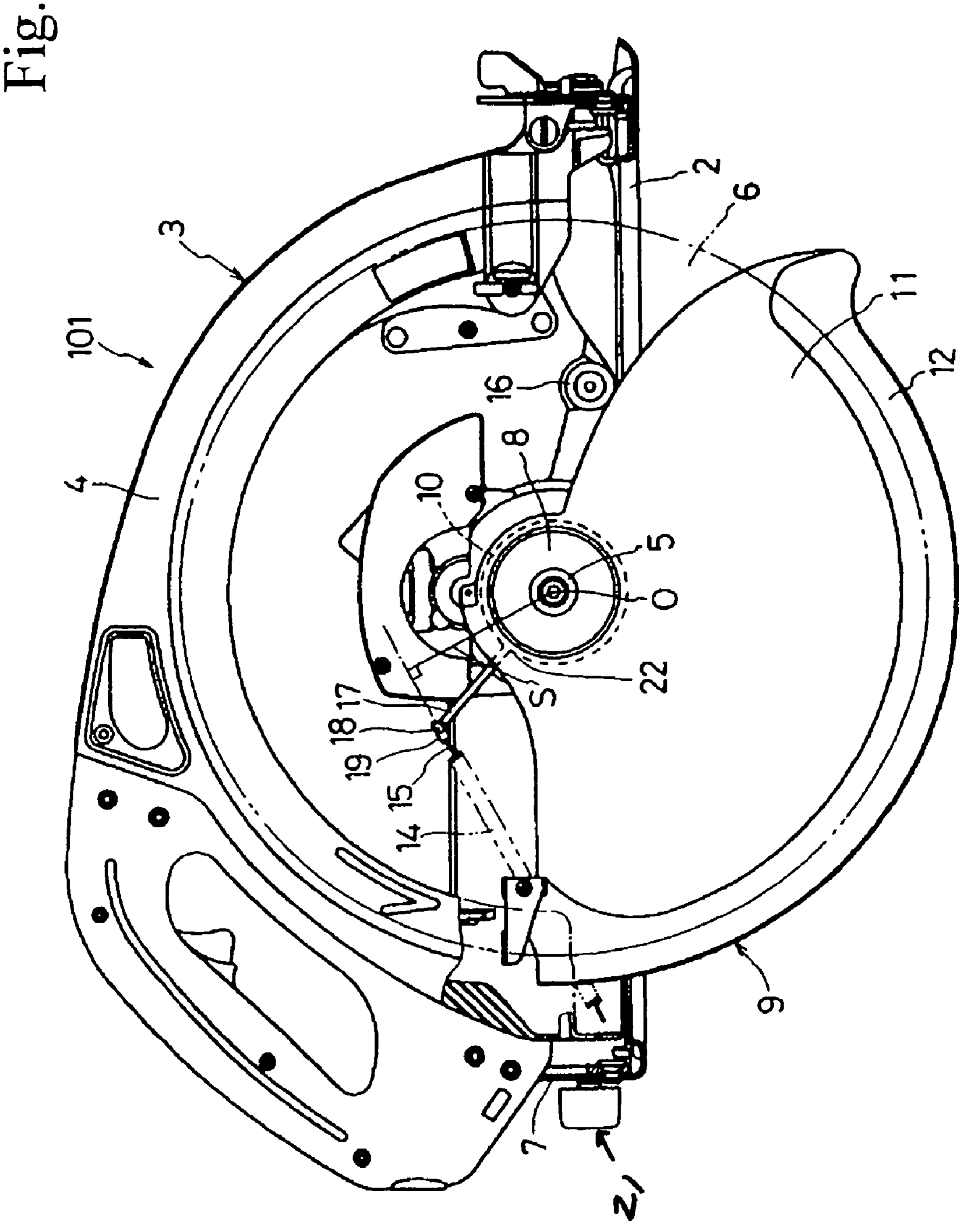
FIG. 4 is a front elevation of an alternate circular saw 101 according to the present invention with a lower blade guard 9 thereof rotated to a closed position.
Figure 5:
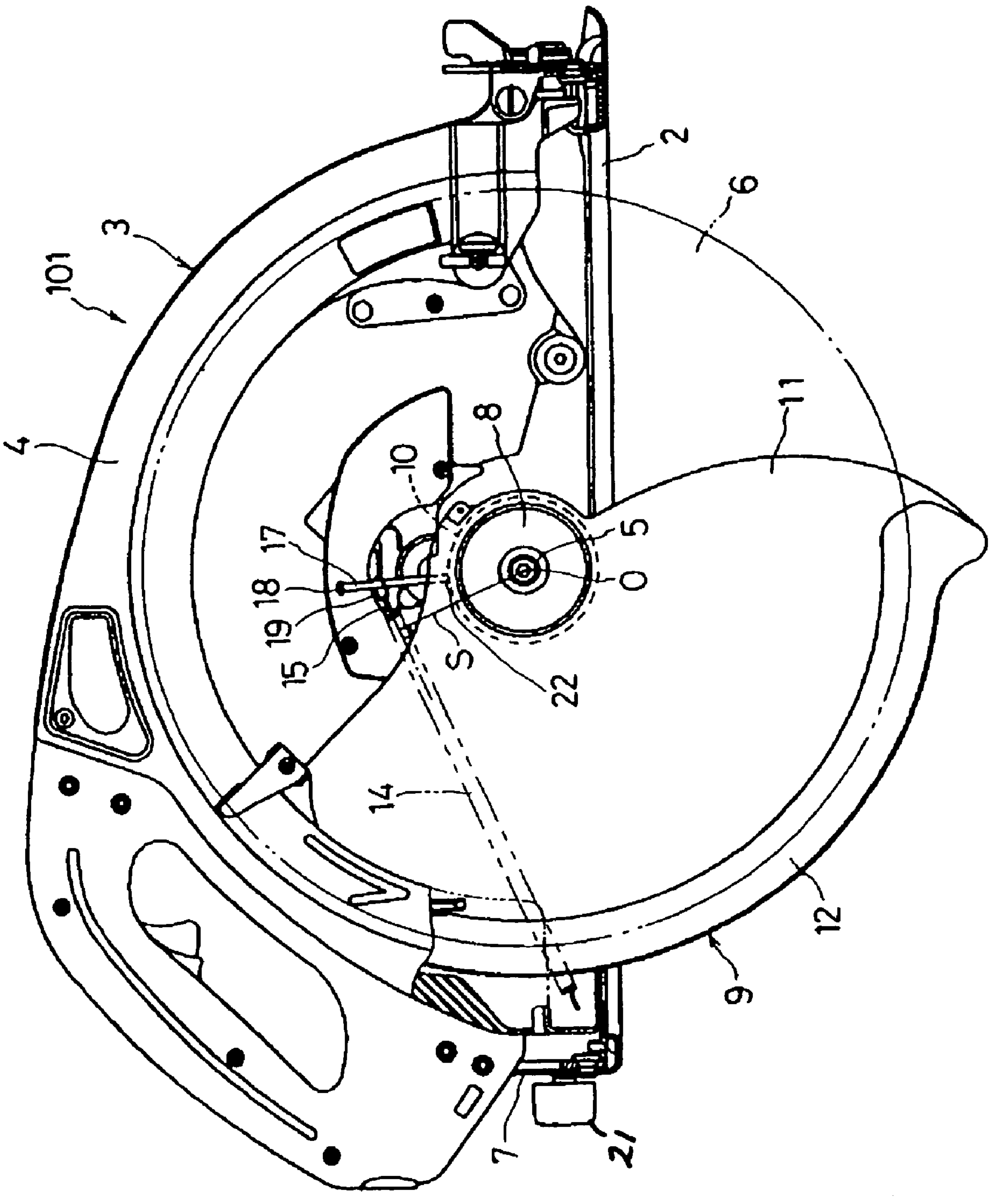
Figure 6:
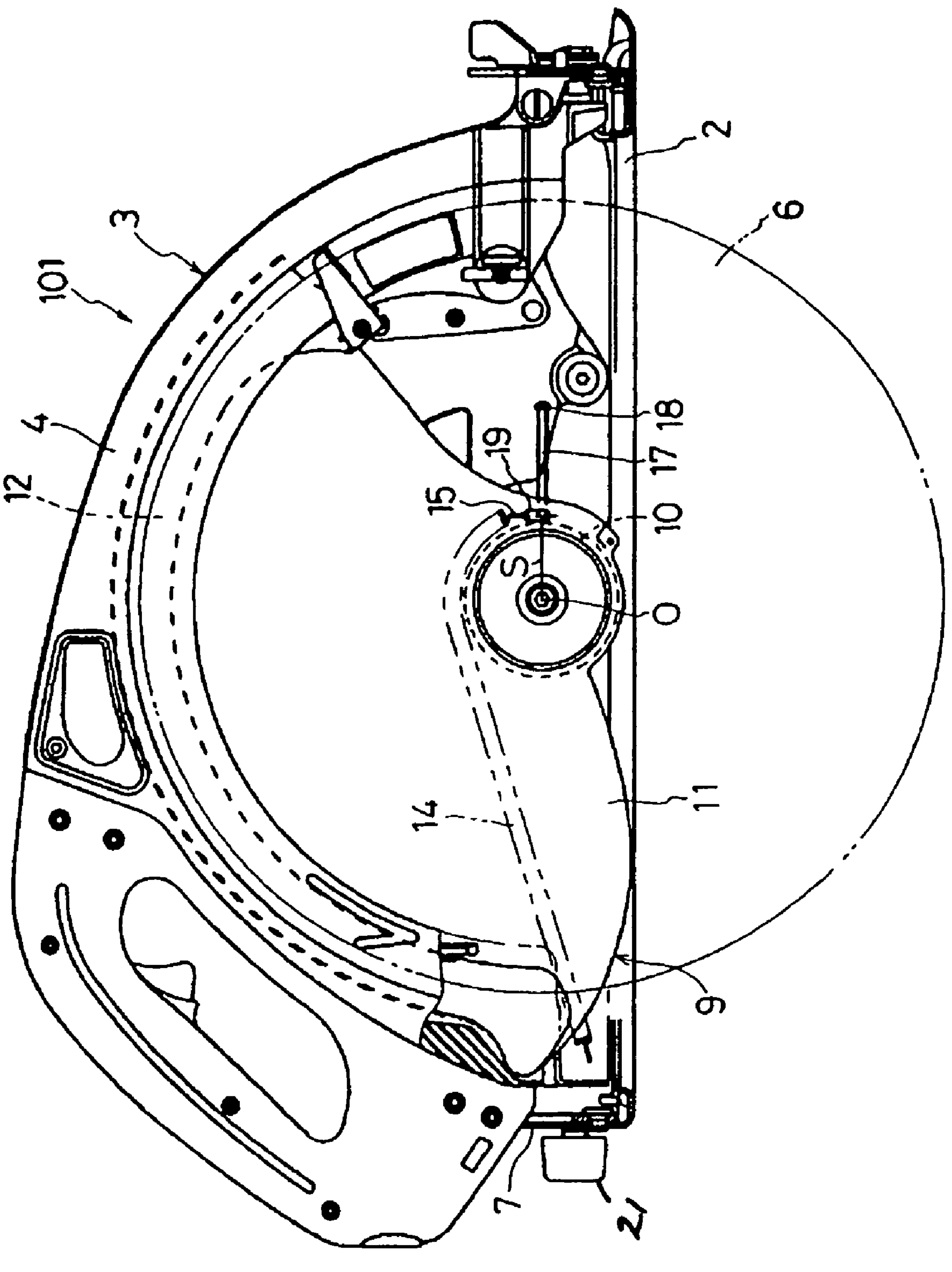

FIG. 5 is another front elevation of the circular saw 101 shown in FIG. 4 with the lower blade guard 9 rotated to intermediate positions; and FIG. 6 is another front elevation of the circular saw 101 shown in FIG. 4 with the lower blade guard 9 rotated to a fully retracted (open) position.

DETAILED DESCRIPTION OF THE PREFERRED EMBODIMENTS

Preferred embodiments of the present invention will be described hereinafter with reference to the attached drawings.

FIRST EMBODIMENT

Figure 1:
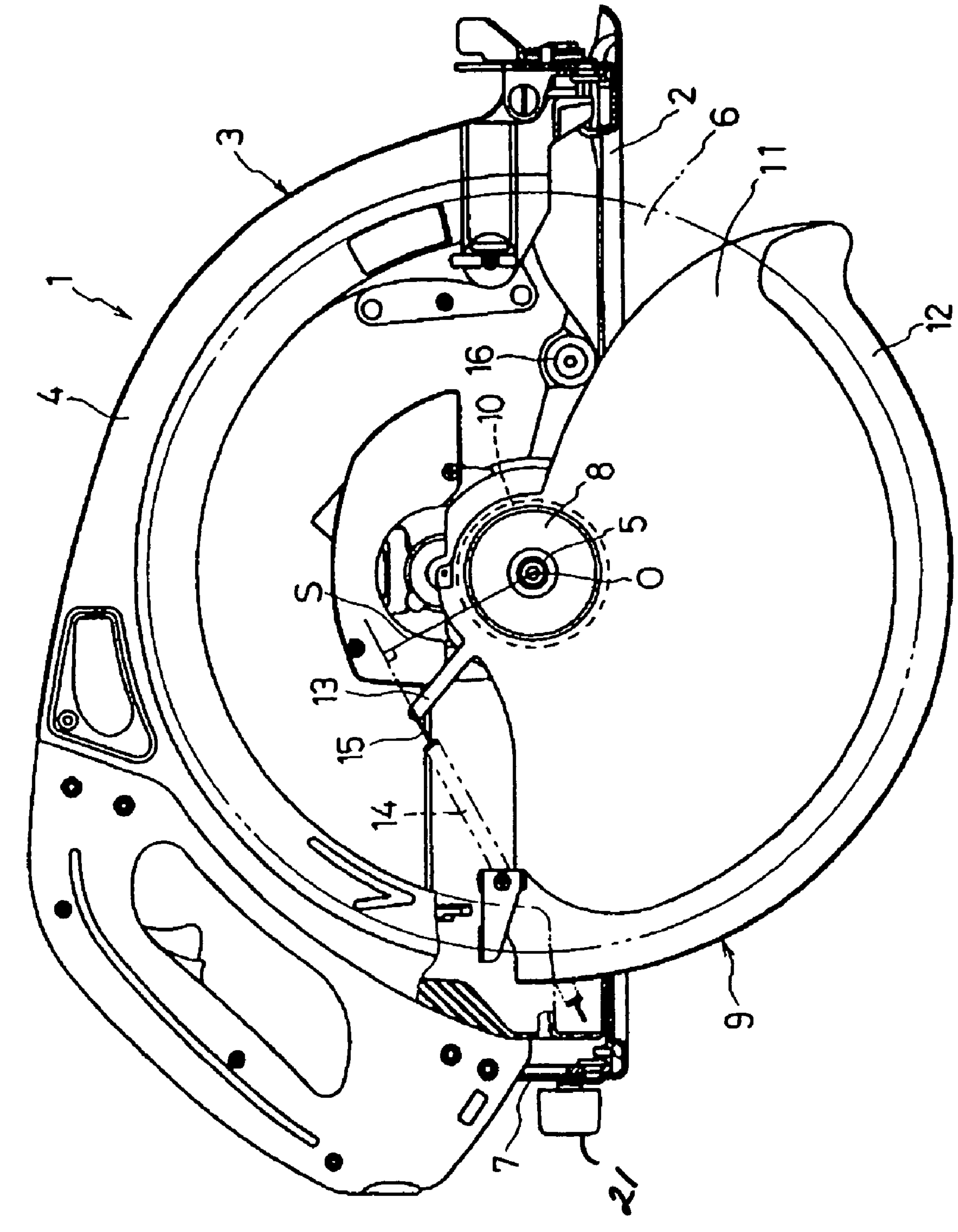
FIG. 1 is a front elevation of a circular saw 1 according to the present invention with a lower blade guard 9 thereof rotated to a closed position.
Figure 2:
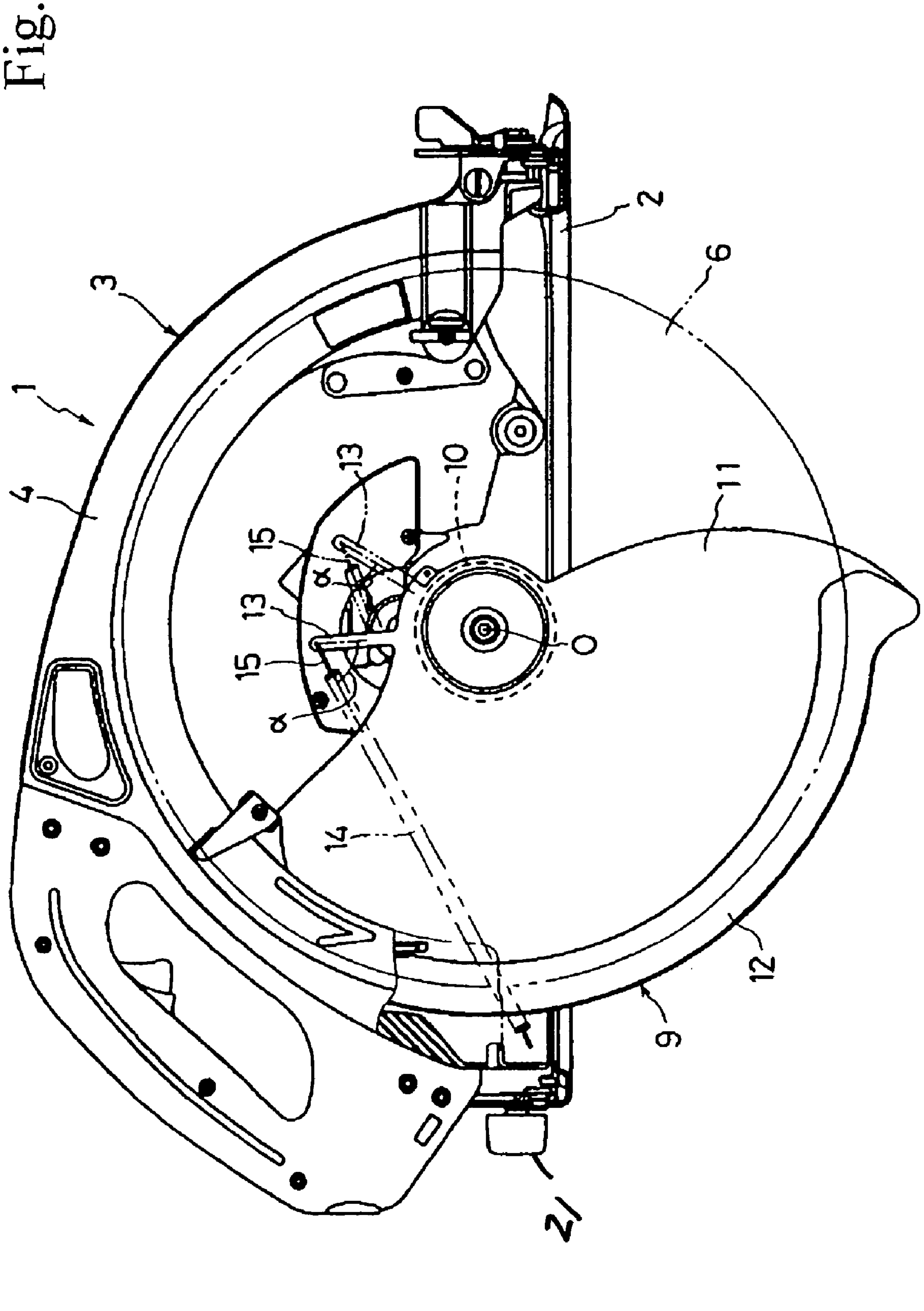
FIG. 2 is another front elevation of the circular saw 1 shown in FIG. 1 with the lower blade guard 9 rotated to intermediate positions.

FIG. 1 is a front elevation of a circular saw 1 according to the present invention. The circular saw 1 includes a generally rectangular and flat base plate 2 and a saw blade assembly 3 mounted on the base plate 2. The saw blade assembly 3 encases a motor (not shown) on its back side and includes an upper blade guard 4 secured to its front side. A spindle 5 transmitting the rotation of the motor is supported by a bearing box 8 coupled to the saw blade assembly 3, projecting from the motor into the space defined by the upper blade guard 4. A circular saw blade 6 is attached at right angles to the top end of the spindle 5 such that approximately half of the blade protrudes below the base plate 2. Furthermore, the right end (as viewed in FIGS. 1–3, i.e., the front end in relation to the direction in which cutting is to be made) of the upper blade guard 4 is hinged to a shaft (not shown) in such a manner as to allow the saw blade assembly 3 to pivot on the shaft. The opposite end of the upper blade guard 4 is coupled to a depth guide 7 which has an arcuate shape conforming to the longitudinal curvature of the upper blade guard 4 by a suitable fixing means such as a thumbscrew 21. Accordingly, the amount of the saw blade 6 protruding below the base plate 2 (i.e., the depth of cut) can be adjusted by loosening of the thumbscrew 21, moving the upper blade guard 4 to a desired vertical position along the depth guide 7, and re-tightening the thumbscrew 21 to tightly hold the guard 4 against any further movement with respect to the base plate 2.

Additionally included in the circular saw 1 is a lower blade guard 9 which in turn includes an annular sleeve portion 10 rotatably fitted around the bearing box 8 that supports the spindle 5. The lower blade guard 9 further includes a sectoral portion 11 which extends radially from the sleeve portion 10 and is disposed behind and in parallel with the saw blade 6. Additionally included in the lower blade guard 9 is a tooth cover 12 which extends from the outer edge of the sectoral portion 11 and is bent around the teeth of the blade 6 to the front edge of the lower blade guard 9, defining a U-shaped cross-section at the periphery of the blade guard 9. A connecting bar 13 projects radially (i.e., along a line passing through the axis O about which the lower blade guard 9 rotates) from the upper left edge of the sectoral portion 11. When the guard 9 is in the closed position shown in FIG. 1, the connecting bar 13 points upper rearward (generally opposite to the direction in which cutting progresses) at a 40-degree angle relative to the horizontal plane passing through the base plate 2. An extension spring 14 is stretched between the top free end of the connecting bar 13 and a lower rear portion of the upper blade guard 4 adjacent to the base plate 2. As illustrated, the extension spring 14 is attached to the connecting bar 13 via a connector 15.

In a circular saw 1 thus constructed, when the saw is not in use, the tensile force exerted by the extension spring 14 acts on the connecting bar 13, biasing the lower blade guard 9 counterclockwise (as viewed in FIG. 1) to its closed position, in which the forward end of the sectoral portion 11 abuts a stopper 16 protruding from the saw blade assembly 3 (as used herein, the term "forward" is intended to indicate the direction in which cutting is to progress). In this position, as shown in FIG. 1, the lower blade guard 9 covers the saw blade's teeth below the base plate 2 except at the forwardmost area. When the lower blade guard 9 is in the closed position, the perpendicular S dropped from the axis of the spring 14 to the rotational axis O of the guard 9 (i.e., the distance between the rotational axis O and the line of action of the spring's tensile force) is substantially at its longest, maximizing the torque or moment of force to rotate the lower blade guard 9 in the counterclockwise direction.

Figure 3:
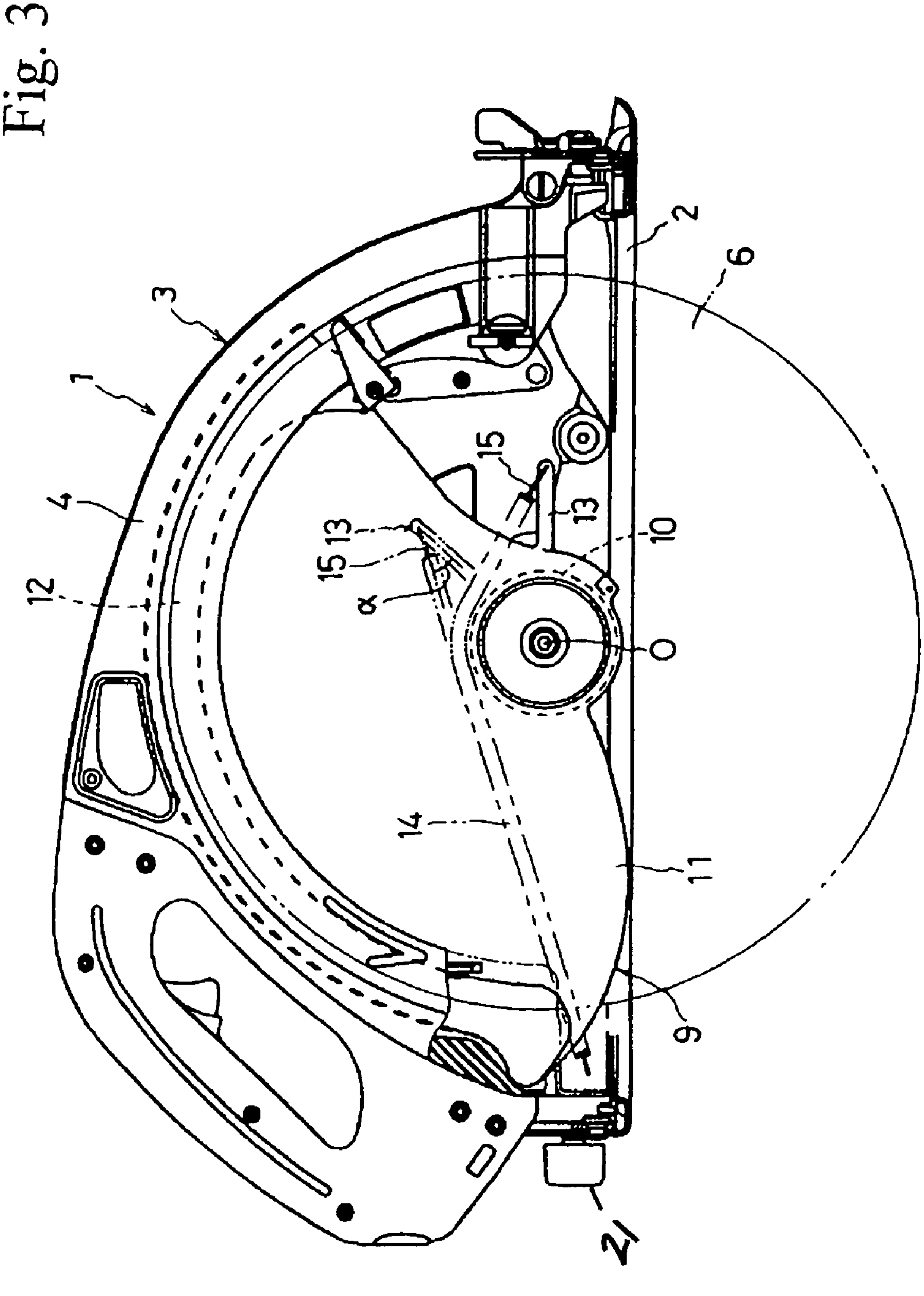
FIG. 3 is another front elevation of the circular saw 1 shown in FIG. 1 with the lower blade guard 9 rotated to intermediate and fully retracted (open) positions.

To make a cut, the operator retracts the lower blade guard 9 in the clockwise direction by abutting the guard 9 against a workpiece. From the start of the clockwise rotation of the guard 9 to the position in FIG. 2 indicated in solid lines, the tensile force of the spring 14 acting on the top end of the connecting bar 13 remains at about the same level, producing similar resistance to the rotation of the guard 9. Beyond this position, as indicated in two-dot chain lines, the angle, $\alpha$, between the axis of the extension spring 14 and the axis of the connecting bar 13 becomes very acute, thereby increasing the component of the spring's tensile force directed along the axis of the connecting bar 13 toward the axis of rotation of the lower guard 9. This in turn reduces the component of the tensile force along the spring 14 and thus the torque acting on the lower blade guard 9, offering lower resistance to the rotation of the guard 9. Referring to FIG. 3, the angle $\alpha$ is minimized when the lower side of the tensile spring 14 comes into contact with the sleeve portion 10 of the blade guard 9 at the position indicated in two-dot chain lines. This angle remains the same to the fully open position of the lower blade guard 9 (shown in solid lines), in which the bottom surface of the base plate 2 is fully placed on the workpiece. This permits smooth rotation or retraction of the blade guard 9 to its fully open position although the tensile force of the spring 14 increases as it is gradually stretched with the rotation of the guard 9.

When the circular saw 1 is removed from the workpiece upon completion of cutting, the lower blade guard 9 is rotated counterclockwise to the closed position shown in FIG. 1 by the tensile force of the spring 14, covering the lower teeth of the saw blade 6 again.

As described above, according to the circular saw 1 of the first embodiment, the connector 15 coupling the spring 14 to the connecting bar 13 is decentered from the rotational axis of the lower blade guard 9 such that the angle $\alpha$, (the angle between the line of action of the spring's tensile force and the line through the connector 15 and the rotational axis) gradually decreases as the guard 9 is retracted from its closed position. This arrangement maximizes the torque on the lower blade guard 9 when it is not used, while gradually decreasing the torque from an intermediate position toward the closed position. Accordingly, if an extension spring with the same tensile force is used, the lower blade guard 9 can be biased to the closed position with greater torque according to the present invention than in the conventional arrangement. This effectively prevents inadvertent rotation of the blade guard due to its weight without compromising the handling comfort of the saw 1 as the resistance to the rotation felt by the operator decreases as the lower blade guard 9 is further rotated or retracted from the intermediate position.

SECOND EMBODIMENT

An alternate structure of the present invention is described hereinafter with reference to the attached drawings, in particular FIGS. 4–6, in which identical or similar reference numerals or characters denote identical or similar parts or elements throughout the several views. Therefore, description of such elements is omitted.

With specific reference to FIG. 4, a circular saw 101 of this embodiment replaces the connecting bar 13 with a connecting bolt or pin 17 which is secured to the sleeve portion 10 of the lower blade guard 9 at a base or bottom end 22 of the bolt and projects upper-rearward along a diametrical line passing through the axis of rotation of the guard 9. The connecting bolt 17 has a head 18 having a larger diameter than the rod portion so as to prevent a ring 19 (to be described in further detail below) attached to the connector 15 from slipping off the bolt 17. Furthermore, the connecting bolt 17 has the same length as the connecting bar 13 described in conjunction with the first embodiment and forms the same angle (40 degrees) with the horizontal plane of the base plate 2 as the bar 13 does when the lower blade guard 9 is in the illustrated fully closed position. The connector 15 fastened to the extension spring 14 is linked to the connecting bolt 17 via the ring 19 loosely slipped on the bolt 17. Thus, the ring 19 is capable of sliding along the connecting bolt 17 between the base 22 and the head 18 of the bolt 17.

In a circular saw 101 thus constructed, when the saw is not in use, the tensile force exerted by the extension spring 14 acts on the connecting bolt 17, biasing the lower blade guard 9 counterclockwise (as viewed in FIG. 4) to its closed position, in which the forward end of the sectoral portion 11 abuts the stopper 16 on the saw blade assembly 3 in much the same manner as in the first embodiment. In this position, the lower blade guard 9 covers the saw blade's teeth below the base plate 2 except at the forwardmost area. When the lower blade guard 9 is rotated to the closed position, the ring 19 linking the connector 15 to the connecting bolt 17 is slid to the uppermost position in abutment with the bolt head 18 due to the angle of the bolt 17 in relation to the base plate 2 and the tensile force of the extension spring 14. As in the first embodiment, when the lower guard 9 is in the closed position, the perpendicular distance, S, from the line of action of the tensile force (i.e., the axis of the spring 14) to the axis O of rotation of the guard 9 is adapted to be substantially at its longest, thus rotating the lower blade guard 9 counterclockwise with the largest torque.

To make a cut, the lower blade guard 9 is rotated clockwise by being abutted on a workpiece. From the start of the clockwise rotation of the guard 9 to a position similar to that shown in FIG. 2 indicated in solid lines, the distance S does not decrease so as to maintain the tensile force of the spring 14 acting on the top end of the connecting bolt 17 at about the same level, producing approximately the same resistance to the rotation of the guard 9 as at the beginning of the rotation. As shown in FIG. 5, as the angle between the axes of the connecting bolt 17 and the extension spring 14 decreases below 90 degrees, the tensile force of the extension spring 14 begins to cause a downward slide of the ring 19 along the bolt 17 toward the base 22. This reduces the distance S and thus the torque acting on the lower blade guard 9, resulting in decreased resistance to the rotation of the guard 9 felt by the operator. As the angle between the axis of the bolt connecting 17 and the horizontal plane of the base plate 2 decreases below 90 degrees with continued rotation of the blade guard, the ring 19 slides to the base 22 of the bolt 17, minimizing the distance S and thus the torque acting on the lower blade guard 9. Accordingly, even when the tensile force of the spring 14 increases with the spring's stretch, the lower blade guard 9 can easily and smoothly be rotated to the fully open position shown in FIG. 6.

When the circular saw 101 is removed from the workpiece upon completion of cutting, the lower blade guard 9 is rotated counterclockwise to the closed position of FIG. 4 by the tensile force of the spring 14, covering the lower teeth of the saw blade 6 again. Concurrently, as the bolt 17 gradually tilts backwards, the ring 19 slides along the connecting bolt 17 into abutment with the head 18 of the bolt 17 at the uppermost position.

As described above, according to the circular saw 101 of the second embodiment, the connector 15 is linked to the bolt 17 in such as a manner as to be slidable from the top of the bolt 17 decentered from the rotational axis O of the lower blade guard 9 toward the rotational axis O during the retraction of the lower blade guard 9. This arrangement maximizes the torque acting on the lower blade guard 9 when it is not used and decreases the torque once the retraction of the guard 9 has passed the intermediate position shown in FIG. 5. Accordingly, if an extension spring with the same tensile force is used, the lower blade guard 9 can be biased to the closed position with greater torque in the illustrative embodiment of the present invention than in the conventional arrangement. This effectively prevents inadvertent rotation of the lower blade guard 9 due to its weight, without compromising the handling comfort of the saw 101, as the resistance to the rotation felt by the operator decreases as the guard 9 is further rotated from the intermediate position. According to the second embodiment in particular, the resistance to the rotation of the lower blade guard 9 is additionally decreased by the reduction in torque due to the shortening of the distance S, as well as the reduction in torque also realized in the first embodiment, i.e., the torque reduction due to the decrease in the angle between the line connecting the connector 15 to the rotational axis and the line of action of the spring's tensile force with the rotation of the guard 9.

As described above, the connector 15 of the extension spring 14 is coupled to the connecting bar 13 in the first embodiment. However, the connector 15 may be coupled to any other suitable structure, such as to the head of a bolt, as in the second embodiment, or to the edge of the sectoral portion 11 of the lower blade guard 9, insofar as the connector 15 is attached to such a structure at the position specified according to the present invention. Similarly, the bolt-ring-connector combination in the second embodiment may be replaced with any other suitable arrangement, insofar as the same or identical effect is obtained. For example, the bolt 17 may be replaced with a connecting bar, as in the first embodiment, or the connector 15 may be adapted to slidably engage a slot in the sectoral portion 11 of the lower blade guard 9 without departing from the scope of the present invention.

Equivalents

It will thus be seen that the present invention efficiently attains the objects set forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

Having thus described the invention, what is claimed as new and desired to be secured by Letters Patent is:

1. A circular saw comprising:

a base plate;

a saw blade assembly mounted on the base plate, the saw blade assembly including a rotatably driven saw blade;

a lower blade guard coupled to the saw blade assembly and removably covering a portion of the saw blade protruding below the base plate, wherein the lower blade guard rotates about an axis of rotation, the lower blade guard including an annular sleeve portion disposed about the axis of rotation, a sectoral portion which extends radially from the sleeve portion behind the saw blade and an elongated connecting bar projecting radially from an upper edge of the sectoral portion; and an extension spring which has a longitudinal axis and is stretched between a first portion of the saw blade assembly and a top end of the connecting bar of the lower blade guard, wherein the extension spring is connected to the first portion of the saw blade assembly at a location that is below the axis of rotation of the lower blade guard, and wherein the top end of the connecting bar is located above the axis of rotation of the lower blade guard, the extension spring rotatably biasing the lower blade guard to a closed position in which the blade guard covers the saw blade, and the extension spring forms a substantially straight line extending from the first portion of the saw blade assembly to the top end of the connecting bar when the lower blade guard is in the closed position, wherein the connecting bar, at which the extension spring is connected to the lower blade guard, is selected such that the angle between the line from the connecting bar to the axis of rotation of the lower blade guard and the line of action of the tensile force of the spring gradually decreases as the lower blade guard is rotated from the closed position to expose the saw blade, wherein the lower blade guard is rotatable between the closed position and a fully open position through an intermediate position in which the extension spring comes into contact with the sleeve portion, the spring bending around the sleeve portion with further rotation of the lower blade guard so that a torque acting on the lower blade guard decreases once retraction of the lower blade guard has passed the intermediate portion as a result of the relative positioning of the connecting bar of the lower blade guard to the saw blade assembly.

2. A circular saw in accordance with claim 1, wherein the perpendicular dropped from the longitudinal axis of the extension spring to the axis of rotation of the lower guard is substantially at its longest when the lower blade guard is in the closed position, such that the torque to rotate the lower blade guard is maximized in the closed position.

3. A circular saw in accordance with claim 1, wherein the angle formed between a plane of the base plate and the line passing through the connecting bar and the axis of rotation is selected to be approximately 40 degrees when the lower blade guard is in the closed position.

4. A circular saw in accordance with claim 1, wherein the saw blade assembly further includes an upper blade guard for generally covering an upper portion of the saw blade, the first portion of the saw blade assembly constituting part of the upper blade guard and being located in a lower rear portion of the upper blade guard adjacent to the base plate.

5. A circular saw in accordance with claim 1, further comprising a stopper mounted on the saw blade assembly behind the saw blade, the sectoral portion of the lower blade guard abutting the stopper when the lower guard is in the closed position while exposing a forwardmost portion of the saw blade.

6. A circular saw comprising:

a base plate;

a saw blade assembly mounted on the base plate, the saw blade assembly including a rotatably driven saw blade;

a lower blade guard coupled to the saw blade assembly and removably covering a portion of the saw blade protruding below the base plate, wherein the lower blade guard rotates about an axis; and an extension spring having a forward end and a rear end and a longitudinal axis therethrough, wherein the extension spring is stretched between the rear end fastened to the saw blade assembly and the forward end connected to a decentered portion of the lower blade guard and rotatably biases the lower blade guard to a closed position in which the blade guard covers the saw blade, wherein the forward end of the extension spring is slidable from the decentered portion toward the axis of rotation of the lower blade guard as the guard is rotated from the closed position to expose the saw blade.

7. A circular saw in accordance with claim 6, wherein the lower blade guard further includes a bolt including, top and bottom ends, a rod extending between the two ends and having a longitudinal axis therethrough, and a head at the top end, the bolt radially projecting from the portion of the blade guard closest to the axis of rotation, with the decentered portion of the guard being located at the top end of the rod, wherein the forward end of the spring is connected to the bolt in such a manner as to be slidable on the rod between the head and the bottom end as the guard is rotated from the closed position.

8. A circular saw in accordance with claim 7, wherein the extension spring further includes at the forward end a ring slipped on the rod for slidably linking the spring to the bolt.

9. A circular saw in accordance with claim 8, wherein the lower blade guard is retractable from the closed position to a fully open position through an intermediate position in which the longitudinal axis of the bolt rod forms a 90-degree angle with the longitudinal axis of the extension spring, beyond which point the tensile force of the spring starts to cause downward slide of the ring along the rod from the top end to the bottom end thereof.

10. A circular saw in accordance with claim 7, wherein the lower blade guard further includes an annular sleeve portion disposed about the axis of rotation, with the bolt projecting from the sleeve portion.

11. A circular saw in accordance with claim 6, wherein when the lower blade guard is in the closed position, the perpendicular dropped from the longitudinal axis of the extension spring to the axis of rotation of the lower guard is substantially at it longest, such that the torque to rotate the lower blade guard is maximized in the closed position.

12. A circular saw in accordance with claim 6, wherein the angle formed between a plane of the base plate and the line passing through the decentered portion and the axis of rotation is selected to be approximately 40 degrees when the lower blade guard is in the closed position.

* * * * *